United States Patent [19]
White

[11] Patent Number: 4,527,434
[45] Date of Patent: Jul. 9, 1985

[54] CYLINDRICAL FORCE TRANSDUCER BEAM

[75] Inventor: Jack M. White, Novelty, Ohio

[73] Assignee: The Babcock & Wilcox Company, New Orleans, La.

[21] Appl. No.: 608,689

[22] Filed: May 10, 1984

[51] Int. Cl.[3] .............................................. G01L 1/22
[52] U.S. Cl. .................................. 73/867.65; 73/720; 338/5
[58] Field of Search ........... 73/862.65, 862.63, 862.67, 73/862.54, 766, 763, 720, 721, 726, 727; 338/2, 3, 4, 5

[56] References Cited

U.S. PATENT DOCUMENTS

| | | | |
|---|---|---|---|
| 3,341,796 | 9/1967 | Eisele | 73/862.65 |
| 4,365,520 | 12/1982 | Zaghi | 73/862.63 |
| 4,424,717 | 1/1984 | White | 73/862.65 |
| 4,432,247 | 2/1984 | Takeno et al. | 73/862.67 |

*Primary Examiner*—Donald O. Woodiel
*Attorney, Agent, or Firm*—Vytas R. Matas; Robert J. Edwards

[57] ABSTRACT

A beam assembly for a force transducer of the type which includes a tapered beam portion having one or more strain gauges attached thereto. The beam assembly is in the form of a one-piece cylindrical member having an L-shaped slot formed therethrough to define a beam portion to which said strain gauge is attached, and a lever portion. A first force transmitting strut is attached to the beam portion and a second force transmitting strut is attached to the lever portion.

6 Claims, 3 Drawing Figures

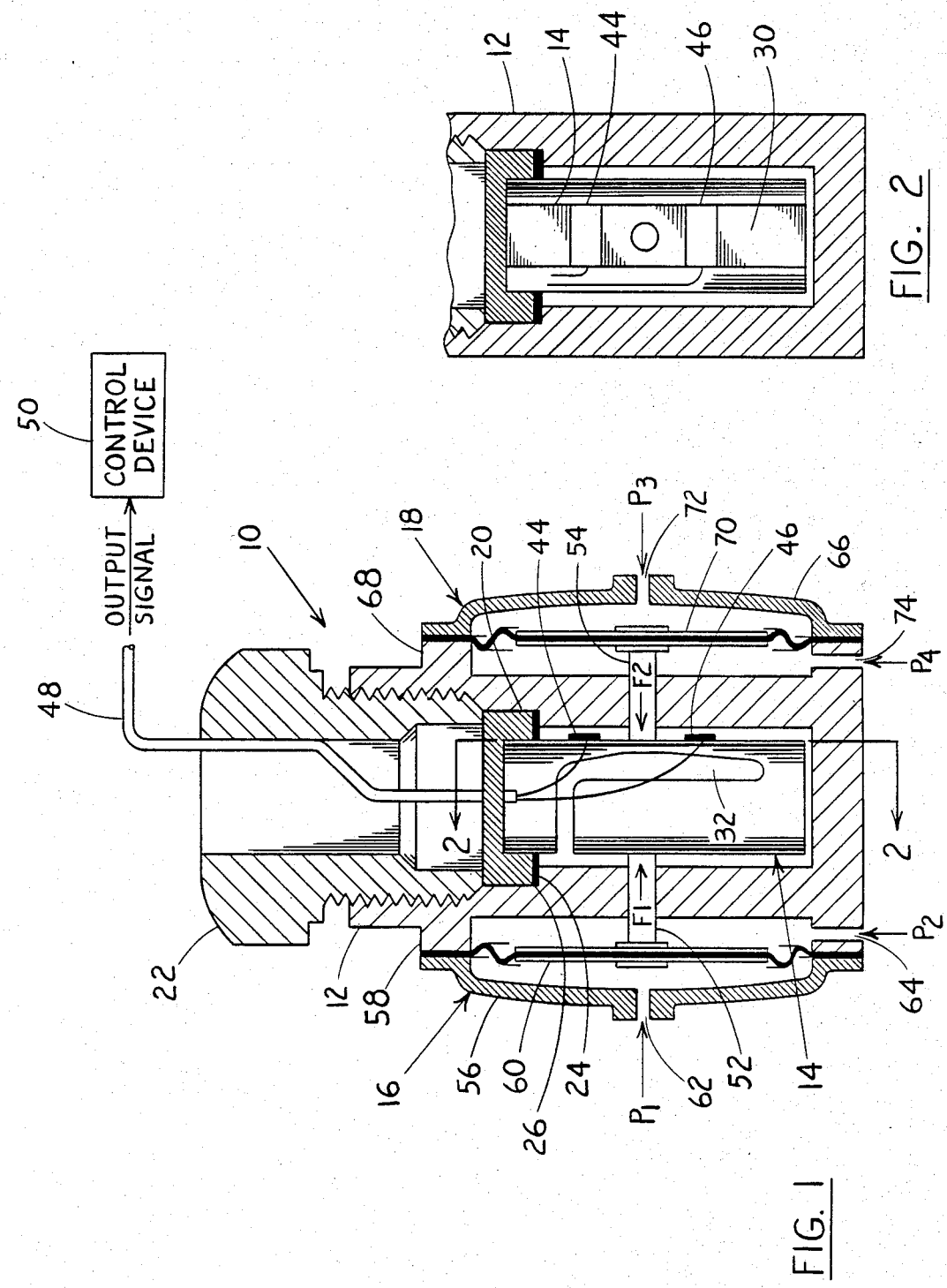

CYLINDRICAL FORCE TRANSDUCER BEAM

TECHNICAL FIELD

The present invention relates to force transducers, and more particularly to an improved beam assembly for a force transducer.

BACKGROUND ART

A typical force transducer generates an output signal which corresponds to an input force. The input force is applied at or near the free end of a leaf spring flexure or beam cantilevered from a fixed support. A force so applied causes a corresponding angular displacement of the beam about the fixed support. The output signal corresponding to the angular displacement of the beam from a null or neutral position is produced by strain gauges bonded to the beam.

An input force applied at or near the free end of a beam of constant cross-sectional area produces a stress which decreases from a maximum at the fixed support. The maximum allowable stress is limited by the material properties of the beam. The average stress, which determines the resolution of the transducer, will necessarily be less than the maximum stress.

U.S. Pat. No. 4,424,717, which is incorporated herein by reference, discloses a force transducer for producing an output signal in proportion to the magnitude of an input force wherein an equal and opposite force is produced by a beam assembly comprising a compound leaf spring flexure having opposed outer sections, anchored in and cantilevered from a fixed and a movable base respectively, which gradually decrease in crosssectional area to a thin middle section wherein the movable base is constrained to linear displacement from a null or neutral position by having the force applied along a line normal to and passing through the center of the thin middle section and transmitted to the movable base through a rigid connection.

In situations in which extreme accuracy is required it is important that the input force be very accurately applied to the center of the beam. The accurate positioning required to accomplish this can be difficult to attain in the above prior art device wherein the beam assembly is received in a separate, movable base member to which the force is applied.

Also, because of the two-piece construction of the prior art device the outside dimensions of the assembly are relatively large, resulting in a significant empty volume within the assembly. Since the empty volume is filled with oil, and certain performance characteristics of the transducer are dependent on the oil volume, it is advantageous to reduce the empty volume to a minimum.

Because of the foregoing, it has now become desirable to develop an extremely accurately aligned beam assembly for a force transducer.

SUMMARY OF THE INVENTION

The present invention provides an improved flexure or beam assembly for a force transducer of the type disclosed in U.S. Pat. No. 4,424,717, in which the beam and the base are formed as a one-piece unit. More specifically, the combined beam and base are formed of a single piece of cylindrical stock, having a flat formed along one side thereof to accept strain gauges, and a generally L-shaped slot is formed through the cylinder to define a relatively thin beam portion, and a relatively thick lever portion. One end of the cylinder is grounded in a fixed base member of the transducer, and transverse holes are formed centrally thereof to receive struts connecting the beam assembly to diaphragms or other force transmitting members of the transducer.

BRIEF DESCRIPTION OF THE DRAWING

FIG. 1 is an elevation view, shown partly in section, of a transducer incorporating the invention;

FIG. 2 is a fragmentary view, shown partly in section, taken along line 2—2 of FIG. 1.

DESCRIPTION OF THE PREFERRED EMBODIMENT

Figure 3:
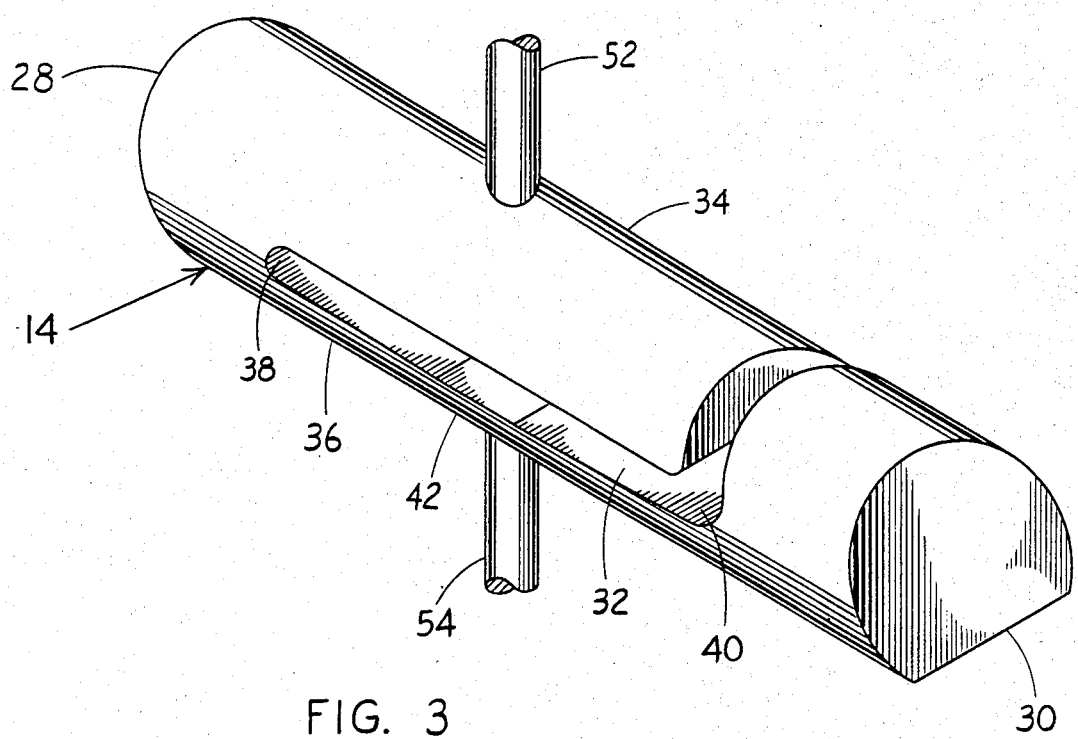
FIG. 3 is a perspective view of the beam assembly of the invention.

Referring to the drawing in which like reference characters designate like or corresponding parts throughout the several views, there is shown a force transducer 10 comprising a cylindrical housing 12, the beam assembly of the invention 14 mounted within the housing, a first diaphragm assembly 16 mounted on one side of the housing and operatively connected to the beam assembly, a second diaphragm assembly 18, a base member 20 in which the beam assembly is anchored, and a nipple 22 which retains the beam assembly within the housing.

The housing 12 is provided with an open end for insertion and removal of the beam assembly 14. The beam assembly is firmly anchored in the base member 20 which is received against a shoulder 24 formed within the housing, and the end of the nipple 22 clamps the base member against the shoulder 24.

Referring particularly to FIG. 3, the beam assembly 14 comprises an essentially cylindrical member 28, having a flat 30 formed along the full length of one side thereof. A substantially L-shaped slot 32 is formed through the member 28 to define a lever portion 34 and a tapered beam portion 36. The beam portion is configured similarly to the compound flexure disclosed in U.S. Pat. No. 4,424,717. Specifically, the beam portion 36 is relatively heavy adjacent the ends 38 and 40 of the long leg of the L-shaped slot, tapering toward the center thereof to a relatively thin center section 42.

Referring to FIGS. 1 and 2, strain gauges 44 and 46 are bonded or otherwise adhered to the flat side 30, and have electrical leads extending therefrom and connected to a cable 48 to provide an output signal to a control device 50 in a known manner.

The force transducer illustrated herein can be applied to the measurement of many different conditions such as absolute or differential pressure, liquid level, or other conditions which can be translated into an input force applied to the beam assembly. In the embodiment illustrated, the transducer 10 is being used to measure differential pressures by means of the diaphragm assemblies 16 and 18, which apply forces F1 and F2 respectively to struts 52 and 54 which are threadedly received in the beam assembly 14 and extend through holes formed in the housing 12.

The first diaphragm assembly 16 comprises a cover member 56 attached to a boss 58 formed on the housing 12 by a plurality of screws or the like (not shown), and a diaphragm 60 attached to the strut 52 and clamped between the cover 56 and the boss 58. A difference between the pressure P1 at port 62 and the pressure P2 at the port 64 results in a force applied to the strut 52 by the diaphragm, resulting in turn in an output signal produced by the strain guages 44 and 46 which is proportional to the force, as also described in U.S. Pat. No. 4,424,717.

The second diaphragm assembly 18 is identical to the diaphragm assembly 16, comprising a cover member 66, a boss 68, a diaphragm 70, and pressure ports 72 and 74, and is operable to apply a force F2 to the beam assembly which is proportional to the difference between pressures P3 and P4.

Certain modifications and improvements will occur to those skilled in the art upon reading the foregoing description. It will be understood that all such improvements and modifications have been deleted herein for the sake of conciseness and readability, but are properly within the scope of the following claims.

I claim:

1. In a transducer generating an output signal varying in proportion to changes in the magnitude of a force applied thereto, comprising a housing; a beam assembly cantilever mounted within said housing, said beam assembly including a tapered beam portion; and at least one strain gauge attached to said beam portion and operable to generate an output signal proportional to the strain in the beam produced by a force applied to said beam assembly; the improvement wherein said beam assembly comprises a single substantially cylindrical member having one end anchored to said housing and the other end free, a substantially L-shaped slot formed in said cylindrical member to define a lever portion and said beam portion, a first force transmitting member attached to said lever portion and a second force transmitting member attached to said beam portion.

2. Apparatus as defined in claim 1, in which said first and second force transmitting members comprise first and second struts extending from said cylindrical member perpendicular to the longitudinal axis thereof.

3. Apparatus as defined in claim 2, in which said first and second struts extend through said housing for attachment to first and second force producing means.

4. Apparatus as defined in claim 1, in which said L-shaped slot is formed with the long leg thereof parallel to the longitudinal axis of said cylindrical member and displaced from said axis, and the short leg thereof perpendicular to said axis, said tapered beam portion being formed between said long leg and the adjacent side of said cylindrical member.

5. Apparatus as defined in claim 4, in which said cylindrical member has a flat formed on one side thereof adjacent the long leg of said L-shaped slot.

6. Apparatus as defined in claim 5, in which at least one strain gauge is attached to said flat.

* * * * *